US010627867B2

(12) United States Patent
Cheng et al.

(10) Patent No.: US 10,627,867 B2
(45) Date of Patent: Apr. 21, 2020

(54) HINGE AND HINGE DEVICE OF MOBILE TERMINAL WITH FLLEXIBLE SCREEN, AND MOBILE TERMINAL WITH A FLEXIBLE SCREEN

(71) Applicant: Hangzhou Amphenol Phoenix Telecom Parts Co., Ltd., Hangzhou, Zhejiang (CN)

(72) Inventors: Guanlun Cheng, Zhejiang (CN); Yang Xiao, Zhejiang (CN); Mengyu Si, Zhejiang (CN)

(73) Assignee: Hangzhou Amphenol Phoenix Telecom Parts Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/308,000

(22) PCT Filed: Apr. 6, 2017

(86) PCT No.: PCT/CN2017/079567
§ 371 (c)(1),
(2) Date: Dec. 7, 2018

(87) PCT Pub. No.: WO2017/211115
PCT Pub. Date: Dec. 14, 2017

(65) Prior Publication Data
US 2019/0179373 A1    Jun. 13, 2019

(30) Foreign Application Priority Data

Jun. 7, 2016    (CN) .................... 2016 2 0544672 U

(51) Int. Cl.
*E05D 3/06*        (2006.01)
*H05K 1/00*        (2006.01)
(Continued)

(52) U.S. Cl.
CPC ............ *G06F 1/1652* (2013.01); *F16C 11/12* (2013.01); *G06F 1/1681* (2013.01); *H04M 1/02* (2013.01); *H04M 1/022* (2013.01)

(58) Field of Classification Search
CPC ...... F16C 11/12; G06F 1/1652; G06F 1/1681; H04M 1/02; H04M 1/022
See application file for complete search history.

(56) References Cited

U.S. PATENT DOCUMENTS 6,253,419 B1 * 7/2001  Lu ......................... G06F 1/1618
                                                            16/340
7,367,376 B2 * 5/2008  Llagostera Forns ........................
                                                            E04F 10/0611
                                                            160/66

(Continued)

FOREIGN PATENT DOCUMENTS

| CN | 102619866 A | 8/2012 |
| CN | 104613089 A | 5/2015 |
| CN | 205847346 U | 12/2016 |
| WO | WO 2010076639 A2 | 7/2010 |

*Primary Examiner* — Yuriy Semenenko
(74) *Attorney, Agent, or Firm* — Muncy, Geissler, Olds & Lowe, P.C.

(57) ABSTRACT

The present invention provides a hinge of a mobile terminal with a flexible screen. The outer side of the hinge supports the flexible screen. The hinge comprises a main support body, a first bracket and a second bracket rotatably connected to a rotating shaft of the hinge, a first support body and a second support body respectively slidably connected to the first bracket and the second bracket, and a synchronous control mechanism. An auxiliary support body is separately provided between the first support body and the main support body and between the second support body and the main support body. The auxiliary support body is correspondingly located at a bend portion of the hinge in a closed state. The hinge is further provided with a first guide structure rotating around the rotating shaft of the hinge (Continued)

together with the first bracket and a second guide structure rotating around the rotating shaft of the hinge together with the second bracket. The present invention can be applied in a mobile terminal, such as a mobile phone and a computer; it can be not only used as a hinge in the mobile terminal, but also used as a flexible screen supporting structure in the mobile terminal, such that when the mobile phone or computer is opened or closed, the flexible screen can be freely unfolded or bent. Thus, large screen display is achieved even if the size is small.

12 Claims, 14 Drawing Sheets

(51) Int. Cl.
  *G06F 1/16* (2006.01)
  *H04M 1/02* (2006.01)
  *F16C 11/12* (2006.01)

(56) References Cited

U.S. PATENT DOCUMENTS

| | | | |
|---|---|---|---|
| 7,515,707 B2* | 4/2009 | Ka ................. | G06F 1/1616 16/366 |
| 7,730,587 B2* | 6/2010 | Chang .............. | G06F 1/1679 16/340 |
| 2012/0192381 A1* | 8/2012 | Zhang .............. | G06F 1/1681 16/366 |

* cited by examiner

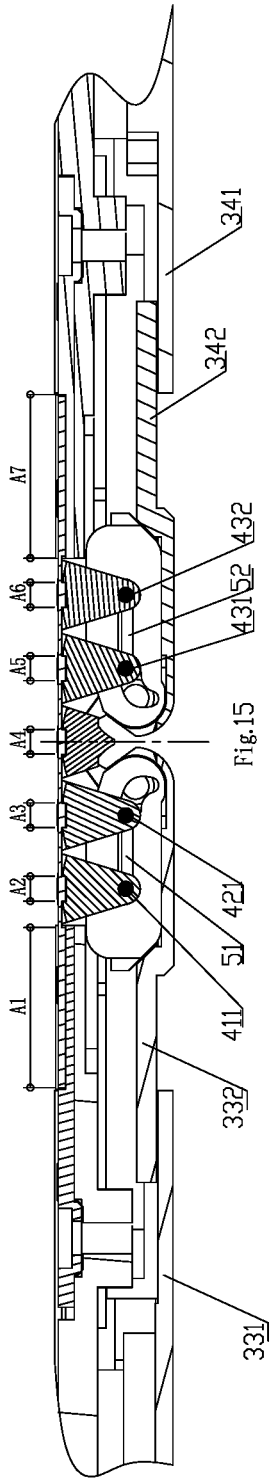
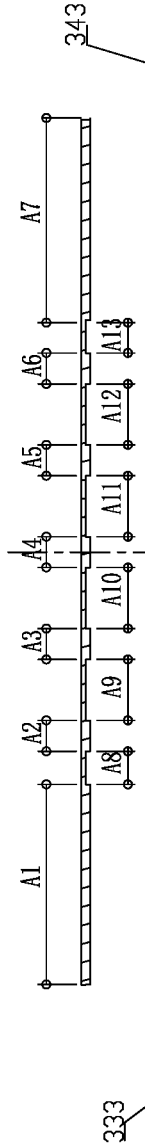
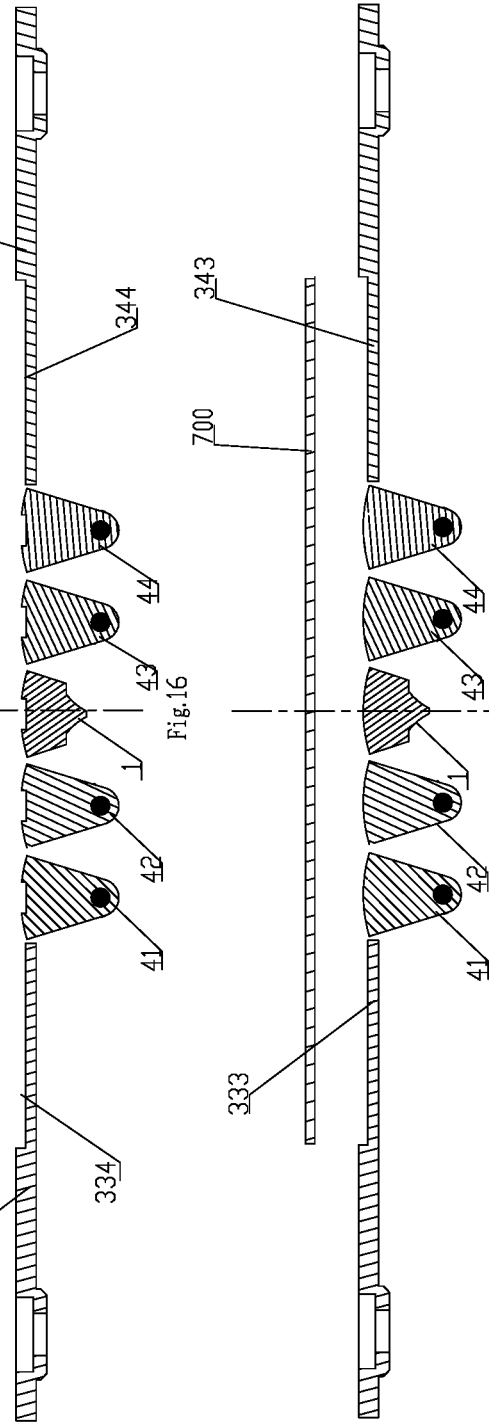

US 10,627,867 B2

HINGE AND HINGE DEVICE OF MOBILE TERMINAL WITH FLLEXIBLE SCREEN, AND MOBILE TERMINAL WITH A FLEXIBLE SCREEN

FIELD OF THE INVENTION

The present invention relates to a mobile terminal and a hinge thereof.

BACKGROUND

A flexible screen is an emerging screen. For a mobile terminal with a flexible screen that is disposed outside the mobile terminal, it is necessary to adapt to the change in length when the hinge is opened or closed.

SUMMARY

An object of the present invention is to provide a hinge of a mobile terminal with a flexible screen. The hinge can be applied in a mobile terminal with flexible screen, and the outer side of the hinge supports the flexible screen. To achieve this object, the present invention adopts the following technical solutions:

A hinge of a mobile terminal with a flexible screen, the outer side of which supports the flexible screen, comprises a main support body provided with a rotating shaft of the hinge, a first bracket and a second bracket rotatably connected to a rotating shaft of the hinge, a first support body and a second support body respectively slidably connected to the first bracket and the second bracket, an auxiliary support body is separately provided between the first support body and the main support body and between the second support body and the main support body, and the auxiliary support body is correspondingly located at a bend portion of the hinge in a closed state;

The hinge is further provided with a first guide structure rotating around the rotating shaft of the hinge together with the first bracket and a second guide structure rotating around the rotating shaft of the hinge together with the second bracket; the auxiliary support body between the first support body and the main support body is provided with a structure that is in guiding engagement with the first guide structure, and the auxiliary support body between the second support body and the main support body is provided with a structure that is in guiding engagement with the second guide structure; The auxiliary support body between the first support body and the main support body can rotate around the rotating shaft of the hinge together with the first bracket and self-rotate, the auxiliary support body between the second support body and the main support body can rotate around the rotating shaft of the hinge together with the second bracket and self-rotate, and the axis of the self-rotation is parallel to the rotating shaft of the hinge, and the center of self-rotation is located at or near the flexible screen support reference surface;

The hinge is further provided with a synchronous control mechanism for synchronously rotating the first support body and the second support body with the rotating shaft of the hinge as an axis.

On the basis of the foregoing technical solution, the present invention further adopts the following technical solutions or combines these technical solutions.

The hinge is further provided with a belt that is an elastic belt or a flexible belt or a belt that is tensioned by an elastic member or a flexible member; the belt passes through the auxiliary support body and the main support body from a path interesting the rotating shaft of the hinge, and smoothens the auxiliary support body during the rotation and under a stop state, to provide flat support for the flexible screen.

Further, a groove is disposed near the outer side of the auxiliary support body and the main support body, and the belt passes through the groove, and a plate is further connected to the notch.

The first guide structure and the second guide structure are both guide grooves, and the auxiliary support body between the first support body and the main support body is provided with a guide pin that is engaged with the first guide structure, and the auxiliary support body between the second support body and the main support body is provided with a guide pin that is engaged with the first guide structure, such that when there are a plurality of auxiliary support bodies between the first support body and the main support body and between the second support body and the main support body, the plurality of auxiliary support bodies can rotate in sequence.

The first guide structure is provided with a limiting structure for the structure that is in guiding engagement with the first guide structure, such that the relative position of the first guide structure and the structure that is in guiding engagement with the first guide structure is in a stable state when the hinge is in a closed state, and the second guide structure is provided with a limiting structure for the structure that is in guiding engagement with the second guide structure, such that the relative position of the second guide structure and the structure that is in guiding engagement with the second guide structure is in a stable state when the hinge is in a closed state.

The synchronous control mechanism comprises a first swing arm and a second swing arm that are rotatably connected to the rotating shaft of the hinge, and the first swing arm and the second swing arm are respectively rotatably connected to one end of the first connecting rod and the second connecting rod, the rotation axes of the first connecting rod and second connecting rod are perpendicular to the rotating shaft of the hinge, and the other ends of the first connecting rod and the second connecting rod are respectively rotatably connected to the first support body and the second support body.

The synchronous control mechanism is located inside of the flexible screen support reference surface and is not in the same plane as the flexible screen support reference surface.

The rotating shafts of the hinge includes a first shaft and a second shaft in parallel, the first bracket is rotatably connected with the first shaft, the second bracket is rotatably connected with the second shaft, the first swing arm of the synchronous control mechanism is rotatably connected with the first shaft, and the second swing arm is rotatably connected with the second shaft.

The hinge is further provided with a sheet that can be repeatedly bent; the sheet is located at the upper surface near the ends of the auxiliary support body and the main support body, and the two ends of the sheet are respectively connected to the first support body and the second support body.

A first guide groove and a second guide groove are respectively disposed on the first bracket and the second bracket, and the first support body and the second support body are respectively connected with a first slider and a second slider that are slidably connected to the first guide groove and the second guide groove; the first slider and/or the second slider are provided with a recess, and the first bracket and/or the second bracket are provided with a clamp spring, and the clamp spring is provided with a convex portion that fits with the recess, and the recess is fit with the convex portion, to provide hand feeling when the hinge is opened and closed appropriately.

Another object of the present invention is to provide a hinge device for a mobile terminal with a flexible screen, the hinge device comprises two hinges of any of the above, and the axes of the rotating shafts of the two hinges are one-to-one coincident, the first support bodies of the two hinges are integrated and the second support bodies are also integrated, the main support bodies of the two hinges are also integrated. The auxiliary support bodies between the first support body and the main support body of two hinges have the same number and are one-to-one connected together. The auxiliary support bodies between the second support body and the main support body of two hinges have the same number and are one-to-one connected together.

A third object of the present invention is to provide a mobile terminal with a flexible screen, the mobile terminal with flexible screen is provided with the foregoing hinge device and the flexible screen, and the flexible screen is disposed outside the mobile terminal with flexible screen.

With the above technical solution, the present invention is reasonable structurally. When it is applied in a mobile terminal, such as a mobile phone and a computer, it can be not only used as a hinge in the mobile terminal, but also used as a flexible screen supporting structure in the mobile terminal, to support the flexible screen at the outer side of the hinge. When the mobile phone or computer is opened or closed, the flexible screen can be freely unfolded or bent. Thus, large screen display is achieved even if the size is small, so that the mobile terminal has a perfect and harmonious appearance when opened or closed.

BRIEF DESCRIPTION OF THE DRAWINGS

FIG. 15 is a cross-sectional view of a hinge device in the open state in Embodiment 2 of the present invention, wherein the sheet adopts the structure of FIG. 14.

FIG. 16 is an exploded view of the structure shown in FIG. 15.

FIG. 17 is a structural exploded view of Embodiment 2 of the present invention in which the sheet adopts another embodiment.

DETAILED DESCRIPTION

Example 1

Figure 1:
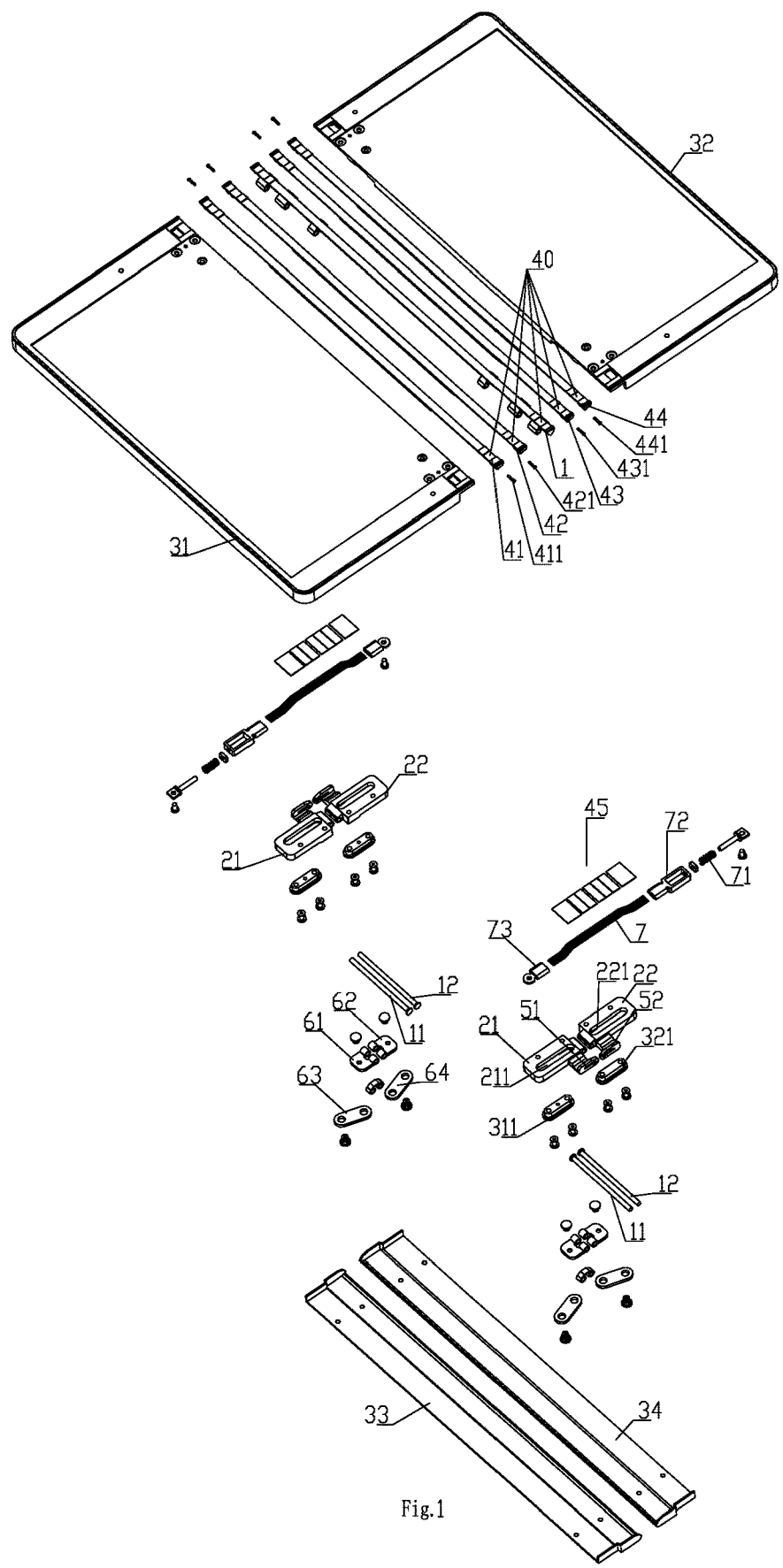
FIG. 1 is an exploded view of Embodiment 1 of the present invention.

Referring to FIGS. 1 to 9, a hinge of a mobile terminal with a flexible screen, the outer side of which supports the flexible screen, comprises a main support body 1 provided with a rotating shaft of the hinge as a biaxial hinge, and the main support body 1 is provided with two rotating shafts of the hinge in parallel, i.e. a first shaft 11 and a second shaft 12.

The hinge device is provided with a first bracket 21 and a second bracket 22, a first support body 31 and a second support body 32 slidably connected to the first bracket 21 and the second bracket 22 respectively, the first bracket 21 and the first shaft 11 are rotatably connected, the second bracket 22 and the second shaft 12 are rotatably connected. Guide grooves 211 and 221 are disposed on the first bracket 21 and the second bracket 22 respectively, the first support body 31 and the second support body 32 are respectively connected with sliders 311, 321 that are slidably connected to the guide grooves 211, 221.

An auxiliary support body is separately provided between the first support body 31 and the main support body 1 and between the second support body 32 and the main support body 1, and the auxiliary support body is correspondingly located at a bend portion of the hinge in a closed state.

The number of auxiliary support bodies on each side can be determined according to the thickness of the mobile terminal and the size of the auxiliary support body itself. In this embodiment, two auxiliary support bodies are used in each side, and they are respectively marked 41, 42, 43, 44.

The auxiliary support bodies 41, 42 between the first support body 31 and the main support body 1 can rotate around the rotating shaft 11 of the hinge together with the first bracket 21 and self-rotate, the auxiliary support bodies 43, 44 between the second support body 32 and the main support body 1 can rotate around the rotating shaft 12 of the hinge together with the second bracket 22 and self-rotate, and the axis of the self-rotation is parallel to the rotating shafts 11, 12 of the hinge, and the center of self-rotation is located at or near the flexible screen support reference surface. The flexible screen support reference surface is a layer whose length does not change during the opening and closing of the mobile terminal when the hinge is applied to the mobile terminal, which is generally the layer where the flexible screen is located or slightly lower or higher than the layer.

The hinge is further provided with a first guide structure rotating around the rotating shaft 11 of the hinge together with the first bracket 21 and a second guide structure rotating around the rotating shaft 12 of the hinge together with the second bracket 22, the first guide structure may be a guide groove 51 disposed on the first bracket 21, and the second guide structure may be a guide groove 52 disposed on the second bracket 22. The auxiliary support bodies 41, 42 between the first support body 31 and the main support body 1 are provided with a structure that is in guiding engagement with the first guide structure, which may be a guide pin that is engaged with the guide groove 51, marked as 411, 421, respectively. The auxiliary support bodies 43, 44 between the second support body 32 and the main support body 1 are provided with a structure that is in guiding engagement with the second guide structure, which may be a guide pin that is engaged with the guide groove 52, marked as 431, 441, respectively.

The above-described guiding engagement further defines the height of the auxiliary support body in the height direction of the hinge (i.e., the direction of the thickness of the mobile terminal), which makes the support height of the bend portion of the hinge, the first support body 31, the second support body 32 on the flexible screen to be consistent, and the actual support of the bend portion of the hinge to conform to the flexible screen support reference surface as much as possible. In addition, the guide grooves 51 and 52 also limit the end surfaces of the auxiliary support bodies 41, 42, 43, 44, playing a role of limiting the auxiliary support bodies in the direction of the length of the hinge (i.e. the vertical direction of FIG. 2).

Figure 2:
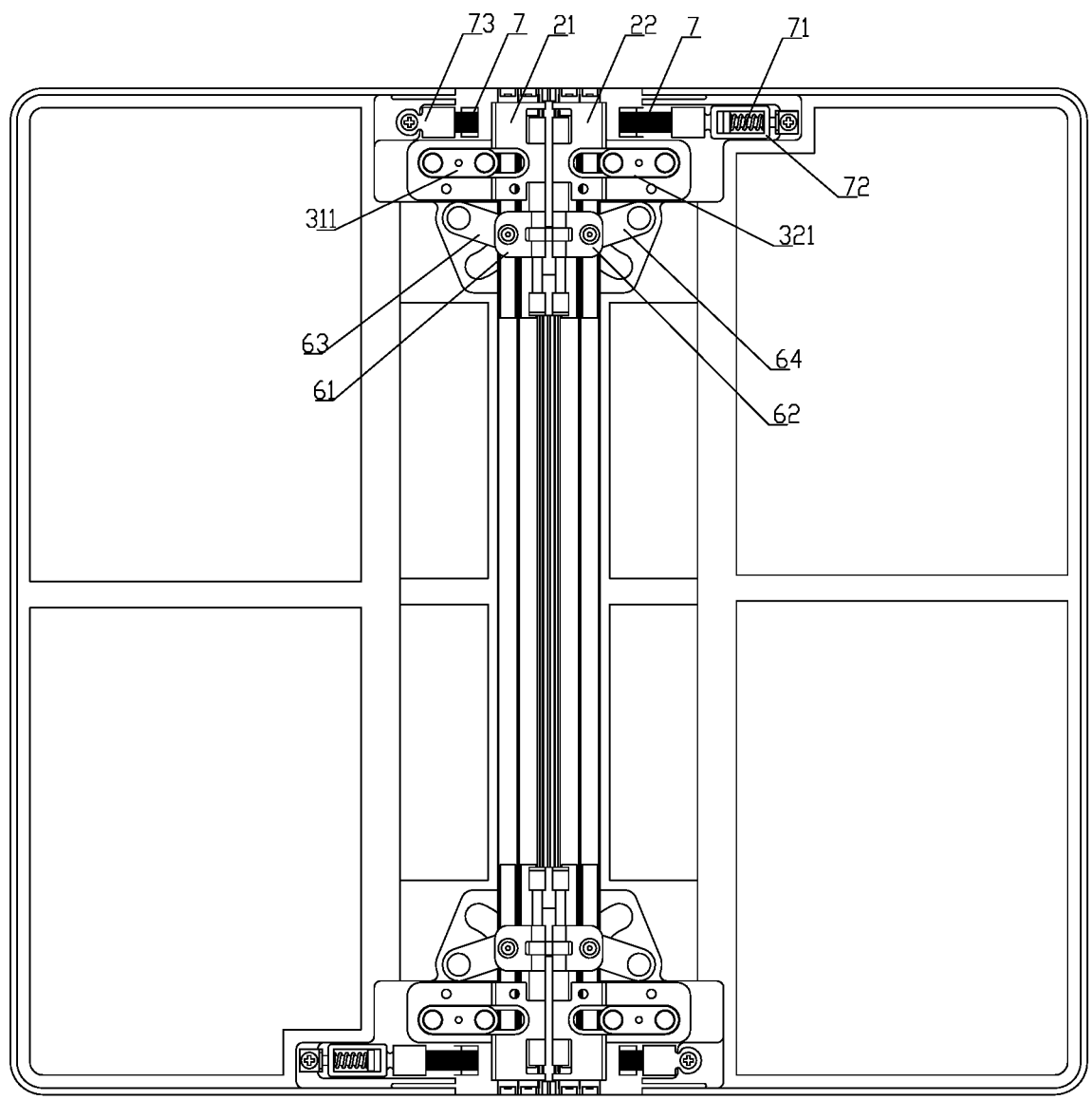
FIG. 2 is a schematic structural view of a hinge in the open state in Embodiment 1 of the present invention.
Figure 2A:
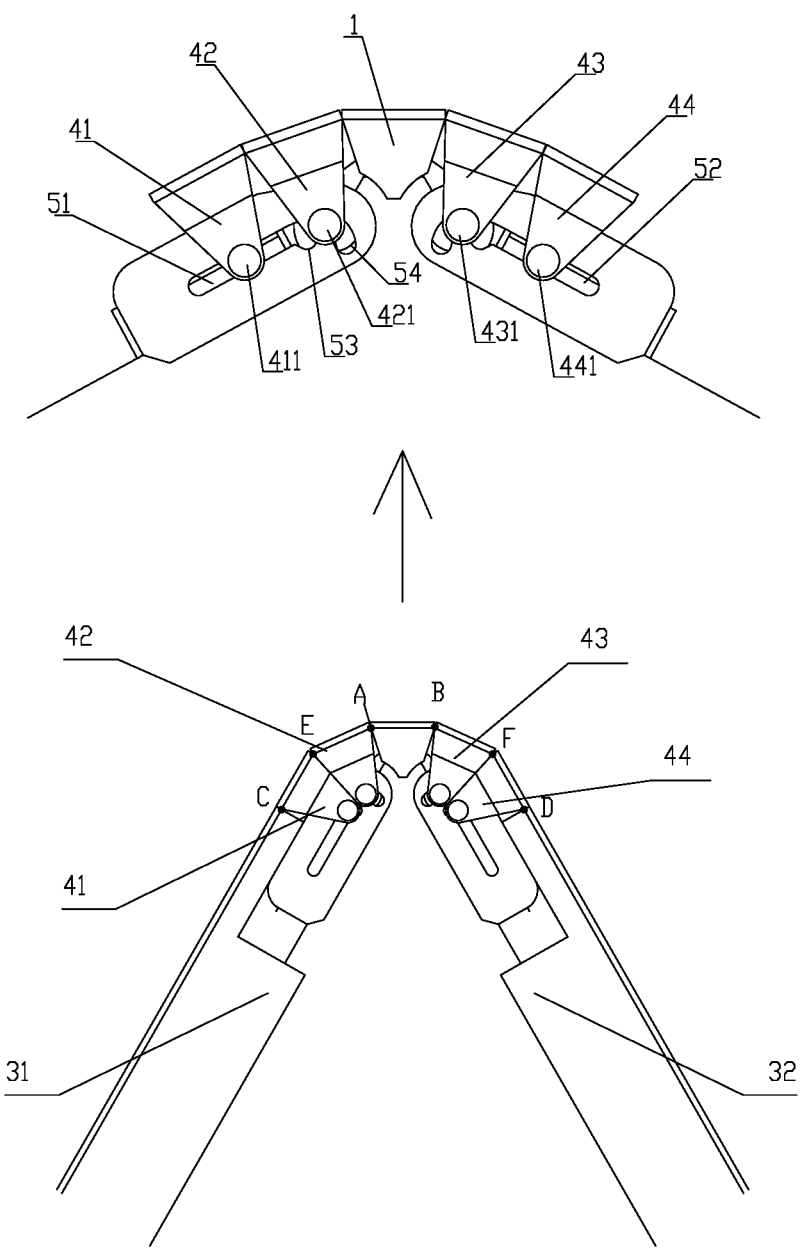
FIG. 2a is a schematic view showing changes in the opening process of a hinge in Embodiment 1 of the present invention.
Figure 3:
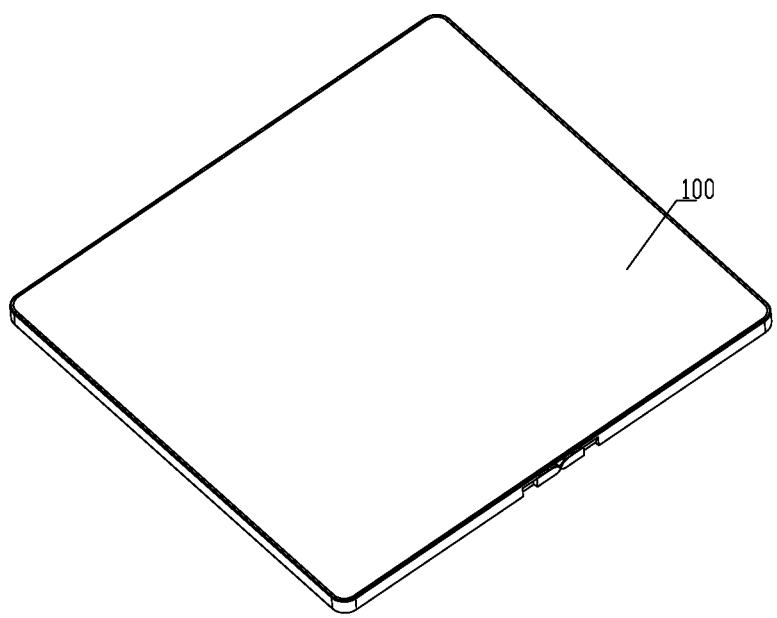
FIG. 3 is an external schematic view of a hinge device in the open state in Embodiment 1 of the present invention.
Figure 4:
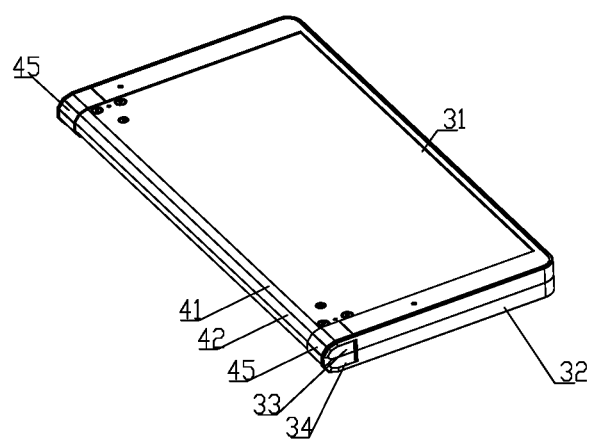
FIG. 4 is a schematic view of a hinge device in the closed state in Embodiment 1 of the present invention.
Figure 5:
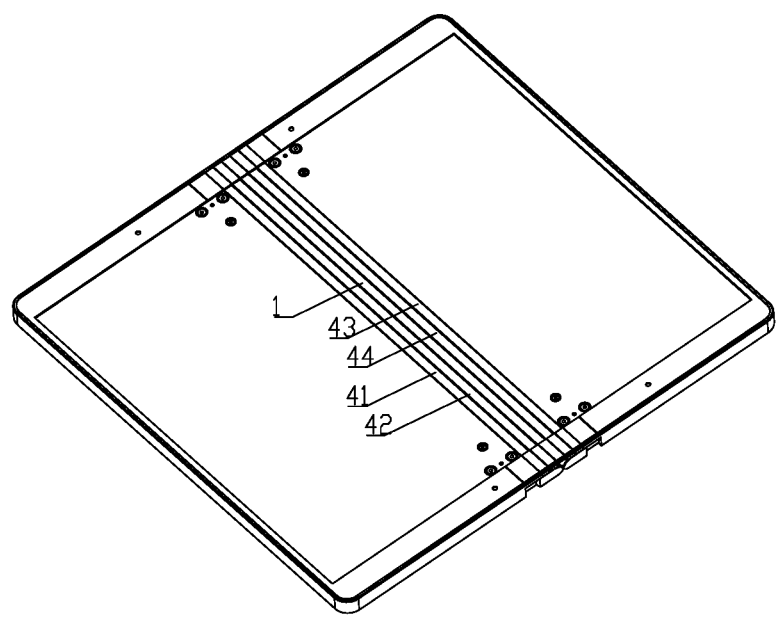
FIG. 5 is a schematic view of the outside of a hinge device in the open state in Embodiment 1 of the present invention.
Figure 6:
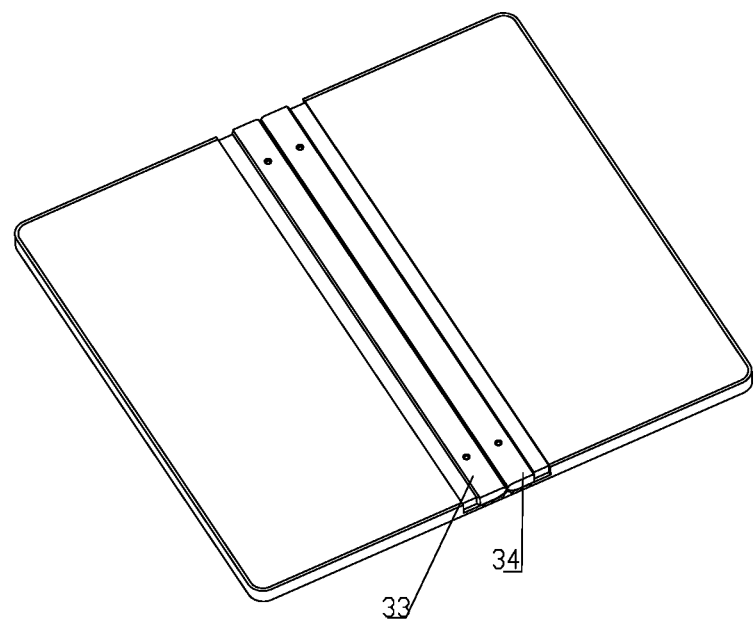
FIG. 6 is a schematic view of the inside of the hinge device in the open state in Embodiment 1 of the present invention.
Figure 7:
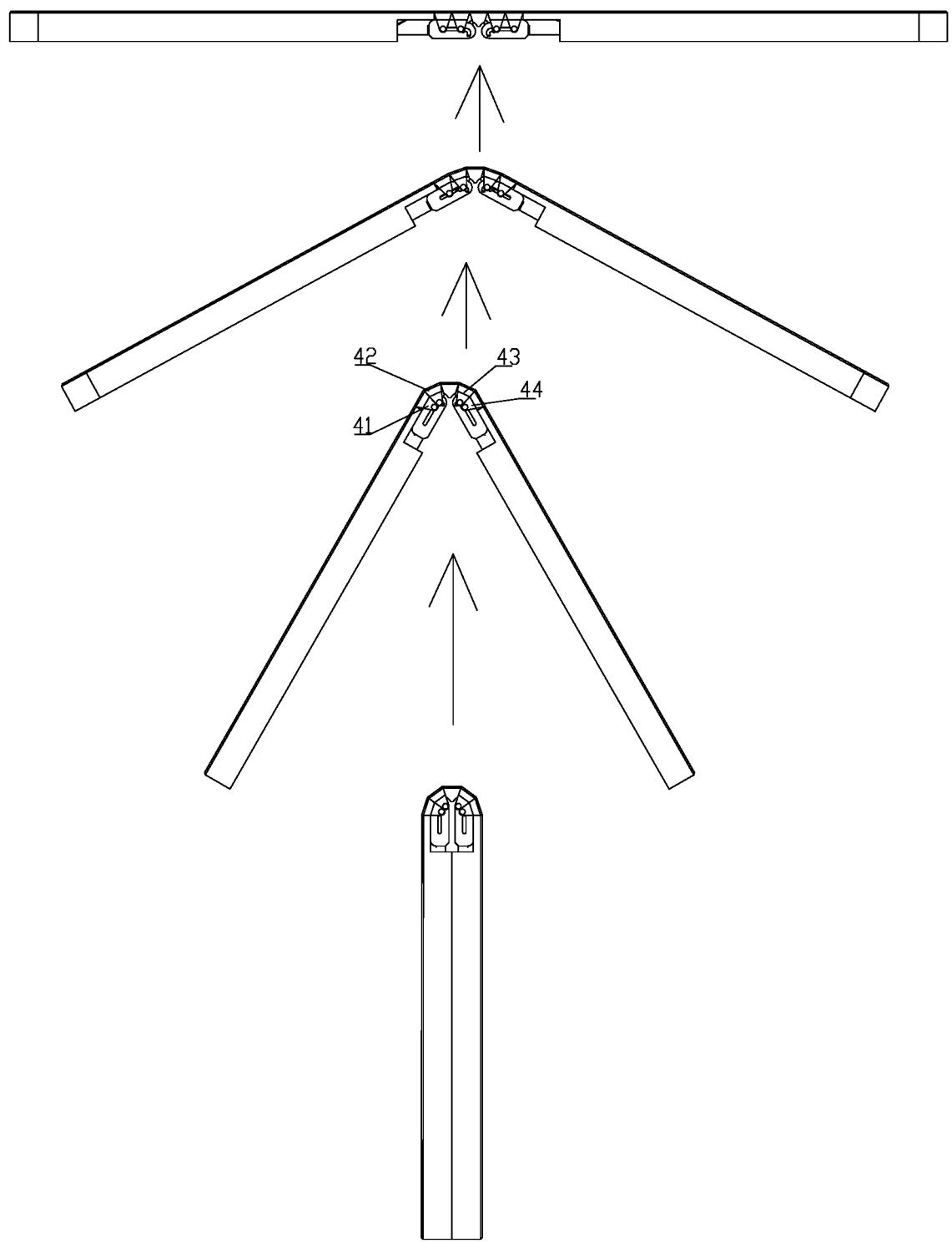
FIG. 7 is a schematic view showing changes in the opening process in Embodiment 1 of the present invention.
Figure 8:
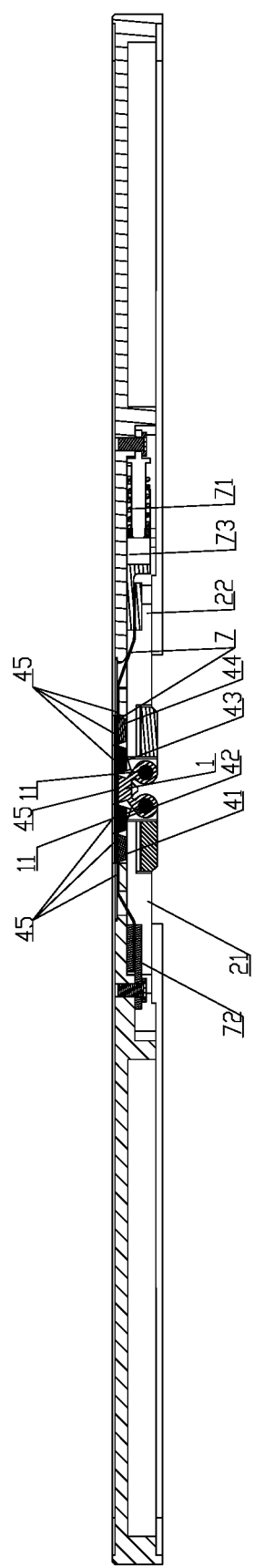
FIG. 8 is a cross-sectional view of a hinge device in Embodiment 1 of the present invention.
Figure 9:
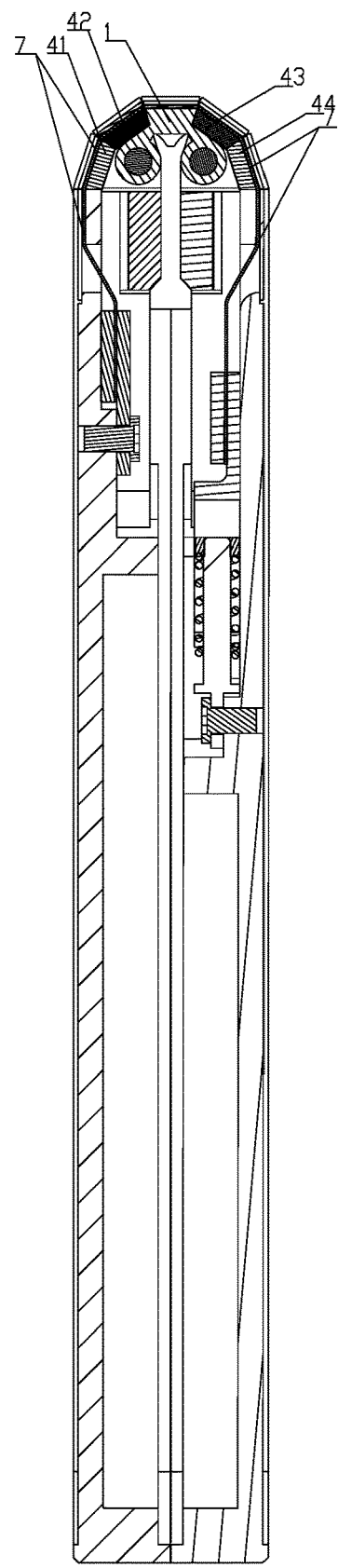
FIG. 9 is a cross-sectional view of a hinge device in the closed state in Embodiment 1 of the present invention.
Figure 10:
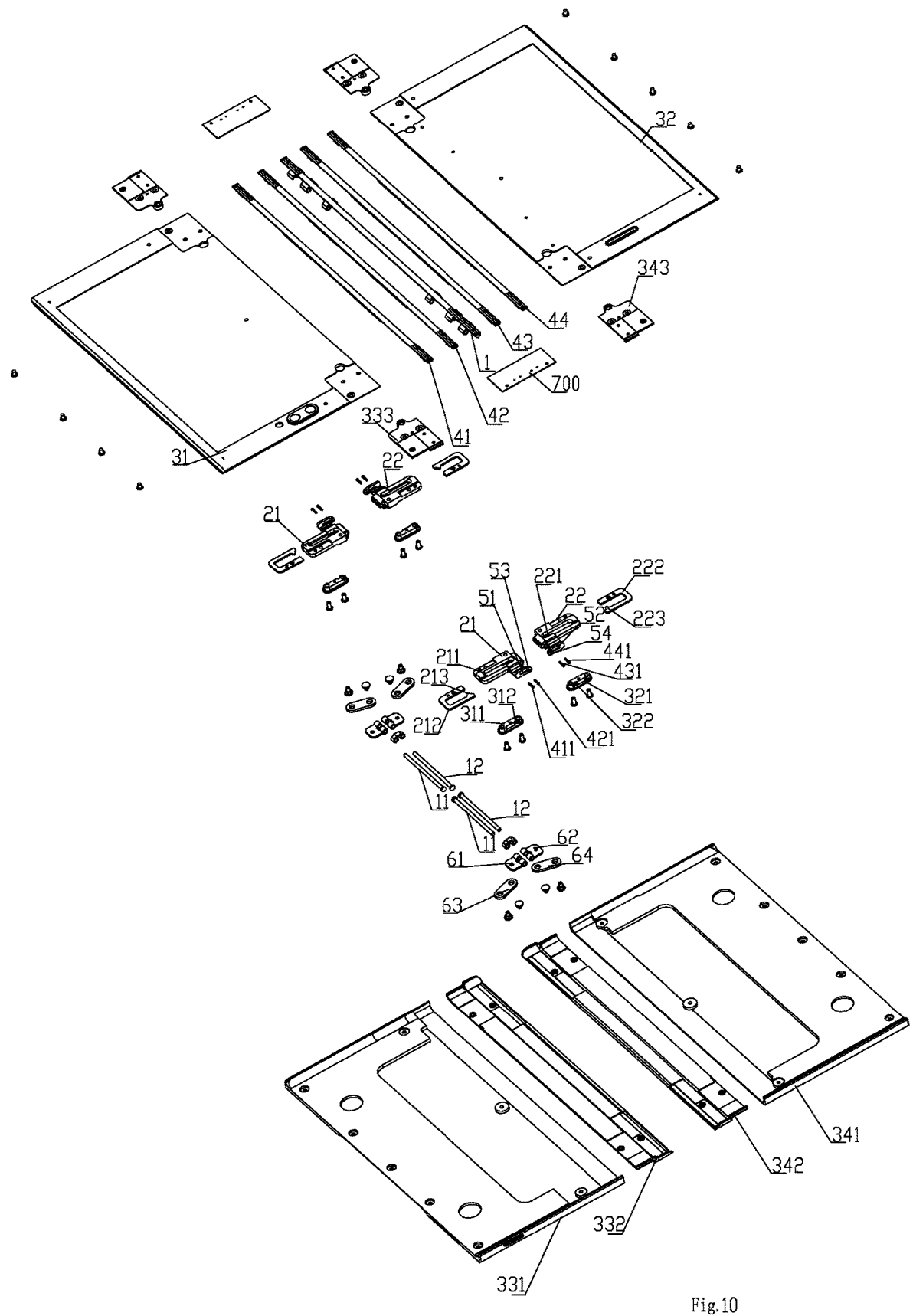
FIG. 10 is an exploded view of Embodiment 2 in the present invention.
Figure 11:
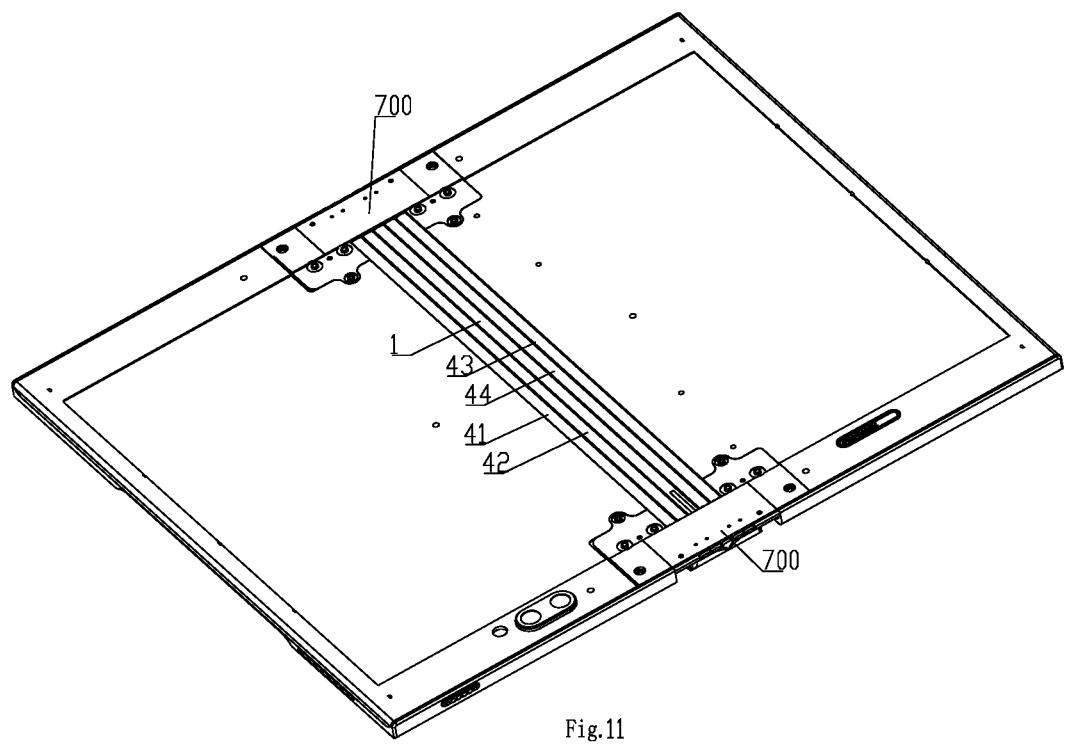
FIG. 11 is a schematic view of the outside of a hinge device in the open state in Embodiment 2 of the present invention.
Figure 12:
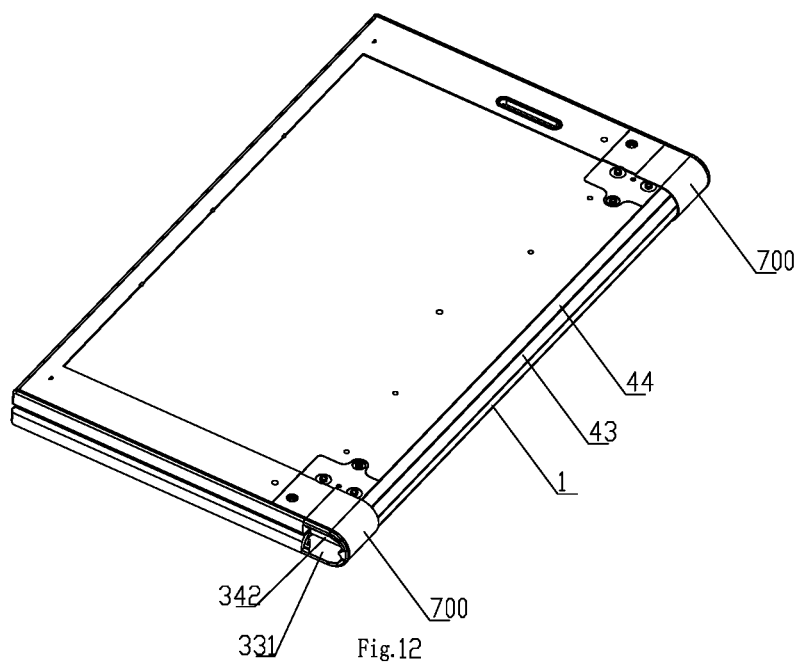
FIG. 12 is a schematic view of a hinge device in the closed state in Embodiment 2 of the present invention.
Figure 13:
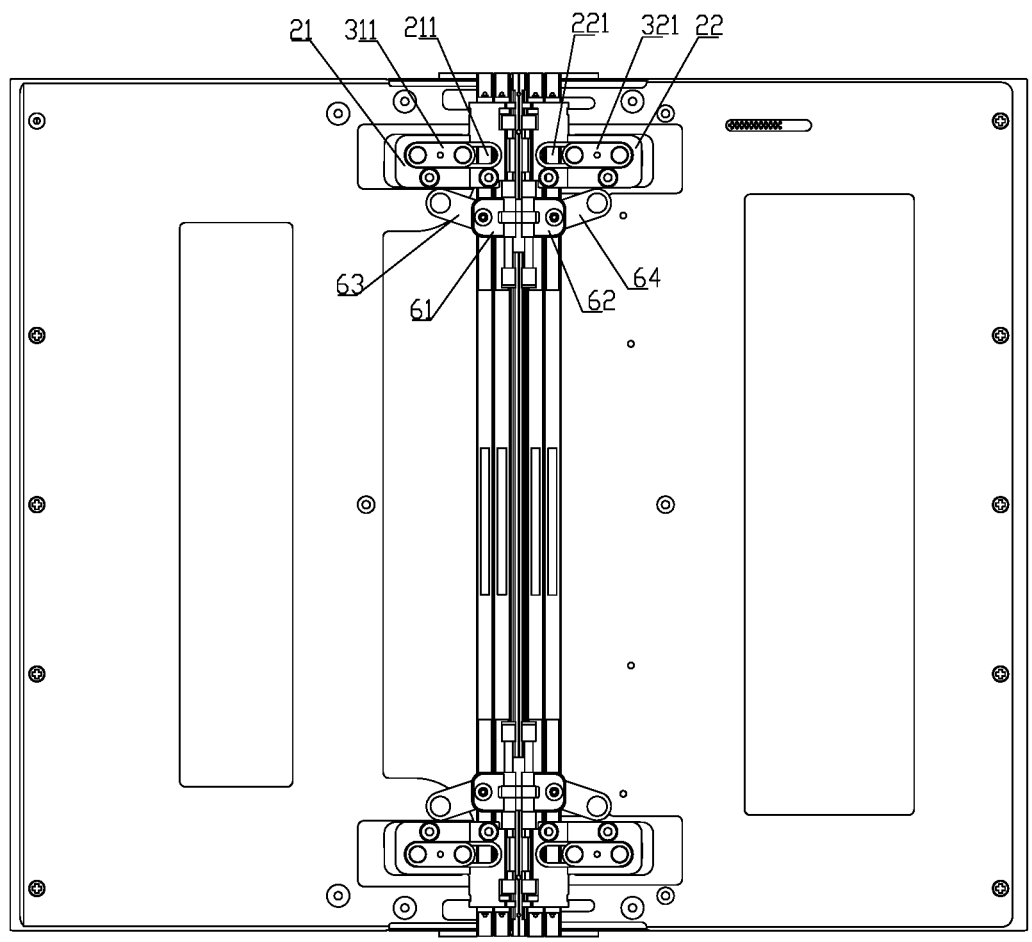
FIG. 13 is a schematic structural view in the open state in Embodiment 2 of the present invention.
Figure 14:
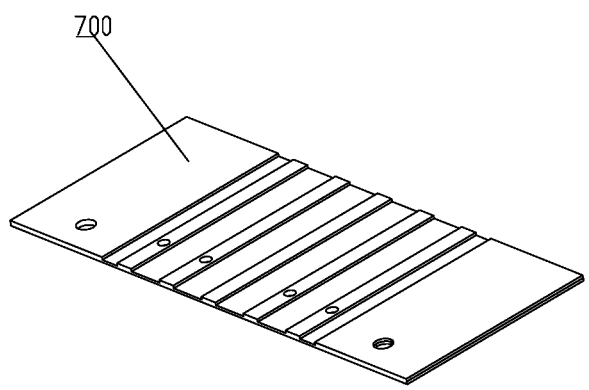
FIG. 14 is a schematic view of an embodiment of a sheet in Embodiment 2 of the present invention.
Figure 18:
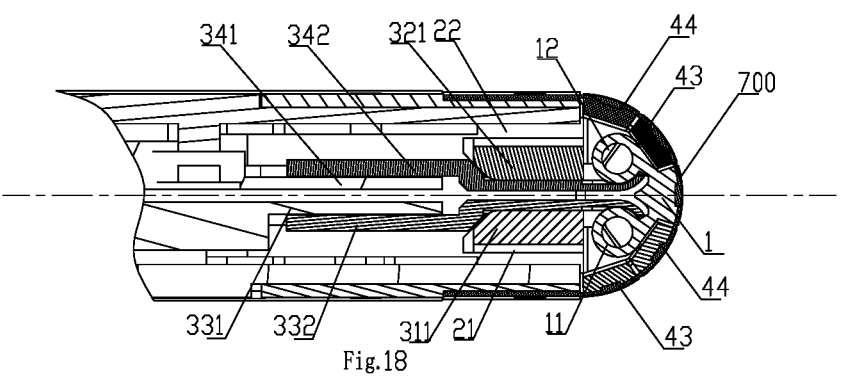
FIG. 18 is a schematic view of a hinge structure after being closed as shown in FIG. 15.
Figure 19:
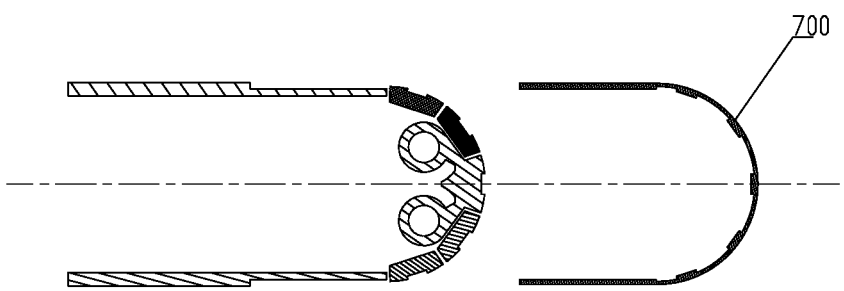
FIG. 19 is an exploded view of FIG. 18.
Figure 20:
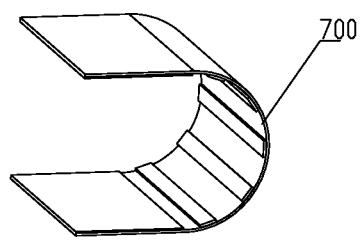
FIG. 20 is a schematic view of a sheet shown in FIG. 14 when the hinge is closed.

When there are a plurality of auxiliary support bodies between the first support body 31 and the main support body 1 and between the second support body 32 and the main support body 1, the foregoing guiding engagement can make the plurality of auxiliary support bodies between the first support body and the main support body and between the second support body and the main support body to rotate in sequence. This process is shown in FIG. 2a and FIG. 7, of which, the mark numbers A, B, C, D, E, and F are the centers of rotation. A plurality of options is available for the rotation sequence. The rotation sequence can be changed by adjusting the guide groove trajectory. Its purpose is to rotate the auxiliary support body in sequence, and facilitate the belt 7 to smoothen the auxiliary support body.

The first guide structure is provided with a limiting structure for the structure that is in guiding engagement with the first guide structure, such that the relative position of the first guide structure and the structure that is in guiding engagement with the first guide structure is in a stable state when the hinge is in a closed state, and the second guide structure is provided with a limiting structure for the structure that is in guiding engagement with the second guide structure, such that the relative position of the second guide structure and the structure that is in guiding engagement with the second guide structure is in a stable state when the hinge is in a closed state. Referring to FIG. 2a, these limiting structures are respectively recesses 53, 54 on the groove wall that are fit with the guide pin.

The hinge is further provided with a synchronous control mechanism, to allow the first support body and the second support body to rotate synchronously with the rotating shaft of the hinge as an axis. The synchronous control mechanism comprises a first swing arm 61 and a second swing arm 62 that are rotatably connected to the rotating shaft of the hinge, the first swing arm 61 and the first shaft 11 are rotatably connected, the second swing arm 62 and the second shaft 12 are rotatably connected, and the first swing arm 61 and the second swing arm 62 are respectively rotatably connected to one end of the first connecting rod 63 and the second connecting rod 64, the rotation axes of the first connecting rod 63 and second connecting rod 64 are perpendicular to the rotating shaft of the hinge, and the other ends of the first connecting rod 63 and the second connecting rod 64 are respectively rotatably connected to the first support body 31 and the second support body 32.

The synchronous control mechanism is located inside of the flexible screen support reference surface and is not in the same plane as the flexible screen support reference surface.

The hinge is further provided with a belt 7 that is an elastic belt or a flexible belt or a belt that is tensioned by an elastic member or a flexible member. The belt may be composed of one or more metal spring wires, fibers (nylon, aramid, polyester, etc.), or metal or fiber strips, or may be tensioned by spring 71 at the ends. One end of the belt 7 is fixedly connected by one of the first support body and the second support body through the connector 73, and the connector 72 at the other end is tightened by the spring 71 supported on the other of the first support body and the second support body. Both ends of the belt can be combined by means of compression, welding with the connector or bonding with glue.

The belt passes from the auxiliary support bodies 41, 42, 43, 44 and the main support body 1 or a component fixedly connected thereto from a path intersecting with the rotating shaft of the hinge, which may produce pressure on these components to smoothen the auxiliary support bodies 41, 42, 43, 44 in the rotation process and in the stop state, to avoid the unevenness of support caused by the deviation of the rotation angle and direction of the different auxiliary support bodies, so that the auxiliary support bodies 41, 42, 43 and 44 together with the main support body 1 can provide a flat support for the flexible screen whether in an open state or closed state of the hinge or during the rotation.

The outer side of the auxiliary support body and the main support body are provided with a groove 40, the belt 7 passes through a path defined by the groove 40, and a plate 45 is connected to the notch of the groove 40. The first support body and the second support body also have corresponding grooves 40 and plates 45. The belt 7 is arranged therein, which is slightly slid by the pulling of one end of the elastic part or slightly deformed by the fitting between the elastic force and the rotating component during the opening or closing of the hinge.

The inner side of the first support body 31 and the inner side of the second support body 32 are further connected with covers 33, 34 for shielding the hinge structure.

As shown in the figure, two hinges are integrated to a hinge device of a mobile terminal, the axes of the rotating shafts 11, 12 of the two hinges are one-to-one coincident, the first support bodies 31 of the two hinges are integrated and the second support bodies 32 of the two hinges are also integrated, the main support bodies 1 of the two hinges are also integrated. The auxiliary support bodies between the first support body 31 and the main support body 1 of two hinges have the same number and are one-to-one connected together. The auxiliary support bodies between the second support body 32 and the main support body 1 of two hinges have the same number and are one-to-one connected together.

A torque mechanism can also be arranged on the rotating shaft of the hinge to provide a rotational resistance by providing a frictional force, so as to stop and position at any time. The torque mechanism can be disposed at any part that is rotatably or slidably connected to the rotating shaft of the hinge in the figure.

The mobile terminal with a flexible screen provided in the present invention may be a mobile phone or a computer, etc., which may be folded in a book form. The mobile terminal with a flexible screen is provided with the above-mentioned hinge device and the flexible screen 100, and the flexible screen is disposed at the outside of the mobile terminal with a flexible screen. The first support body, second support body, main support body, and auxiliary support body form a support for the flexible screen.

Example 2

Referring to FIG. 2 10 to 22, a hinge of a mobile terminal with a flexible screen, the outer side of which supports the flexible screen, comprises a main support body 1 provided with a rotating shaft of the hinge as a biaxial hinge, and the main support body 1 is provided with two rotating shafts of the hinge in parallel, i.e. a first shaft 11 and a second shaft 12.

The hinge device is provided with a first bracket 21 and a second bracket 22, a first support body 31 and a second support body 32 slidably connected to the first bracket 21 and the second bracket 22 respectively, the first bracket 21 and the first shaft 11 are rotatably connected, the second bracket 22 and the second shaft 12 are rotatably connected. Guide grooves 211 and 221 are disposed on the first bracket 21 and the second bracket 22 respectively, the first support body 31 and the second support body 32 are respectively connected with sliders 311, 321 that are slidably connected to the guide grooves 211, 221.

The sliders 311, 321 are respectively provided with recesses 312, 322, the first bracket 21 and the second bracket 22 are provided with clamp springs 212, 222, and the clamp springs 212, 222 are provided with convex portions 213, 223 that fit with the recesses 312, 322. The recesses are fit with the convex portions, to provide hand feeling when the hinge is opened and closed appropriately.

An auxiliary support body is separately provided between the first support body 31 and the main support body 1 and between the second support body 32 and the main support body 1, and the auxiliary support body is correspondingly located at a bend portion of the hinge in a closed state.

The number of auxiliary support bodies on each side can be determined according to the thickness of the mobile terminal and the size of the auxiliary support body itself. In this embodiment, two auxiliary support bodies are used in each side, and they are respectively marked 41, 42, 43, 44.

The auxiliary support bodies 41, 42 between the first support body 31 and the main support body 1 can rotate around the rotating shaft 11 of the hinge together with the first bracket 21 and self-rotate, the auxiliary support bodies 43, 44 between the second support body 32 and the main support body 1 can rotate around the rotating shaft 12 of the hinge together with the second bracket 22 and self-rotate, and the axis of the self-rotation is parallel to the rotating shafts 11, 12 of the hinge, and the center of self-rotation is located at or near the flexible screen support reference surface. The flexible screen support reference surface is a layer whose length does not change during the opening and closing of the mobile terminal when the hinge is applied to the mobile terminal, which is generally the layer where the flexible screen is located or slightly lower or higher than the layer.

The hinge is further provided with a first guide structure rotating around the rotating shaft 11 of the hinge together with the first bracket 21 and a second guide structure rotating around the rotating shaft 12 of the hinge together with the second bracket 22; the first guide structure may be a guide groove 51 disposed on the first bracket 21, and the second guide structure may be a guide groove 52 disposed on the second bracket 22. The auxiliary support bodies 41, 42 between the first support body 31 and the main support body 1 are provided with a structure that is in guiding engagement with the first guide structure, which may be a guide pin that is engaged with the guide groove 51, marked as 411, 421, respectively. The auxiliary support bodies 43, 44 between the second support body 32 and the main support body 1 are provided with a structure that is in guiding engagement with the second guide structure, which may be a guide pin that is engaged with the guide groove 52, marked as 431, 441, respectively.

The above-described guiding engagement further defines the height of the auxiliary support body in the height direction of the hinge (i.e., the direction of the thickness of the mobile terminal), which makes the support height of the bend portion of the hinge, the first support body 31, the second support body 32 on the flexible screen to be consistent, and the actual support of the bend portion of the hinge to conform to the flexible screen support reference surface as much as possible. In addition, the guide grooves 51 and 52 also limit the end surfaces of the auxiliary support bodies 41, 42, 43, 44, playing a role of limiting the auxiliary support bodies in the direction of the length of the hinge.

When there are a plurality of auxiliary support bodies between the first support body 31 and the main support body 1 and between the second support body 32 and the main support body 1, the foregoing guiding engagement can make the plurality of auxiliary support bodies between the first support body and the main support body and between the second support body and the main support body to rotate in sequence. This process is shown in FIG. 2a and FIG. 7, of which, the mark numbers A, B, C, D, E, and F are the centers of rotation. A plurality of options is available for the rotation sequence. The rotation sequence can be changed by adjusting the guide groove trajectory. Its purpose is to rotate the auxiliary support body in sequence, and facilitate the sheet 700 to smoothen the auxiliary support body.

The first guide structure is provided with a limiting structure for the structure that is in guiding engagement with the first guide structure, such that the relative position of the first guide structure and the structure that is in guiding engagement with the first guide structure is in a stable state when the hinge is in a closed state, and the second guide structure is provided with a limiting structure for the structure that is in guiding engagement with the second guide structure, such that the relative position of the second guide structure and the structure that is in guiding engagement with the second guide structure is in a stable state when the hinge is in a closed state. These limiting structures are respectively recesses 53, 54 on the groove wall that are fit with the guide pin.

The hinge is further provided with a synchronous control mechanism, to allow the first support body and the second support body to rotate synchronously with the rotating shaft of the hinge as an axis. The synchronous control mechanism comprises a first swing arm 61 and a second swing arm 62 that are rotatably connected to the rotating shaft of the hinge, the first swing arm 61 and the first shaft 11 are rotatably connected, the second swing arm 62 and the second shaft 12 are rotatably connected, and the first swing arm 61 and the second swing arm 62 are respectively rotatably connected to one end of the first connecting rod 63 and the second connecting rod 64, the rotation axes of the first connecting rod 63 and second connecting rod 64 are perpendicular to the rotating shaft of the hinge, and the other ends of the first connecting rod 63 and the second connecting rod 64 are respectively rotatably connected to the first support body 31 and the second support body 32.

The synchronous control mechanism is located inside of the flexible screen support reference surface and is not in the same plane as the flexible screen support reference surface.

The hinge is further provided with a sheet 700 that can be repeatedly bent. The sheet 700 may be a steel strip, a memory alloy strip, a woven fabric strip, a metal ribbon, etc. The sheet is located at the upper surface near the ends of the auxiliary support bodies 41, 42, 43 and 44 and the main support body 1, and the two ends of the sheet 700 are respectively connected to the first support body 31 and the second support body 32. The sheet 700 may be connected by welding, glue bonding, riveting, etc.

The sheet 700 is located at or close to the flexible screen support reference surface.

The first support body 31 and the second support body 32 may be respectively provided with a concave portion to connect with the sheet 700. The concave portions are respectively provided with connecting bases 333, 334 of the stepped surfaces. Both ends of the sheet 700 are located at the stepped surfaces 334, 344, so that the sheet 700 is located at or close to the flexible screen support reference surface while maintaining the design of thinning of the hinge.

Figure 21:
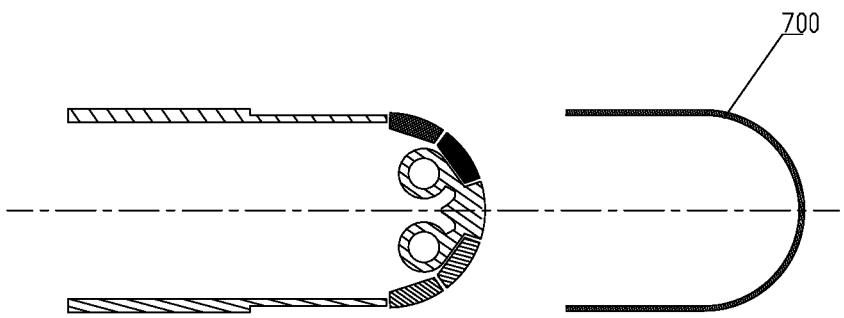
FIG. 21 is an exploded view of a hinge structure shown in FIG. 17 after being closed.
Figure 22:
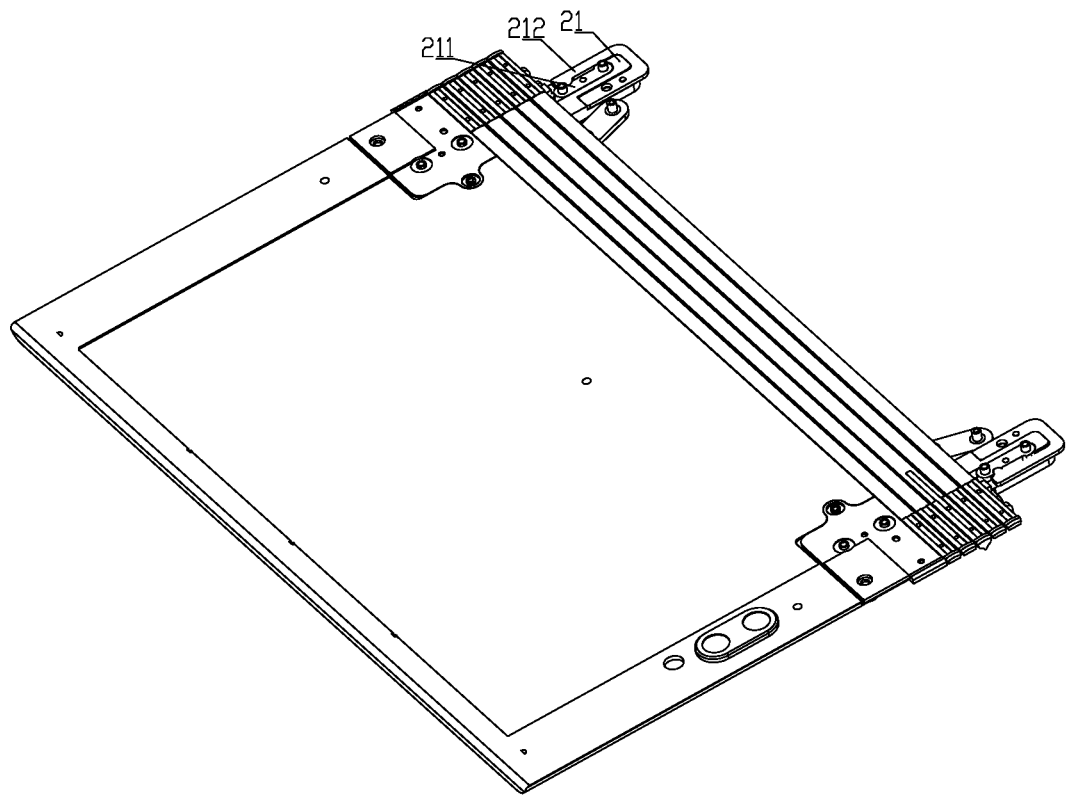
FIG. 22 is a schematic view showing the engagement of a slider and a clamp spring in a hinge.

As shown in FIGS. 17, 21, the sheet 700 may be of the uniform thickness. As shown in FIGS. 14, 15, 16, 18, 19, 20, the sheets may also be inconsistent in thickness. For the inconsistent thickness, the thick parts (A1, A2, A3, A4, A5, A6, A7) are connected to the main support body, the auxiliary support body, the first support body 31 and the second support body 32 to enhance the connection strength, while the thin parts (A8, A9, A10, A11, A12, A13) are deformed, to increase the number of life times during bending.

The sheet 700 may smoothen the auxiliary support bodies 41, 42, 43, 44 in the rotation process and in the stop state, to avoid the unevenness of support caused by the deviation of the rotation angle and direction of the different auxiliary support bodies, so that the auxiliary support bodies 41, 42, 43 and 44 together with the main support body 1 can provide a flat support for the flexible screen whether in an open state or closed state of the hinge or during the rotation.

The inner side of the first support body 31 and the inner side of the second support body 32 are further connected with covers 331, 341, and the inner side of the first bracket 21 and the inner side of the second bracket 22 are also connected with covers 332, 342, the cover 331 has an overlapping portion with the cover 332, and the cover 332 has an overlapping portion with the cover 342 for shielding the above hinge structure.

As shown in the figure, two hinges are integrated to a hinge device of a mobile terminal, the axes of the rotating shafts 11, 12 of the two hinges are one-to-one coincident, the first support bodies 31 of the two hinges are integrated and the second support bodies 32 of the two hinges are also integrated, the main support bodies 1 of the two hinges are also integrated. The auxiliary support bodies between the first support body 31 and the main support body 1 of two hinges have the same number and are one-to-one connected together. The auxiliary support bodies between the second support body 32 and the main support body 1 of two hinges have the same number and are one-to-one connected together.

A torque mechanism can also be arranged on the rotating shaft of the hinge to provide a rotational resistance by providing a frictional force, so as to stop and position at any time. The torque mechanism can be disposed at any part that is rotatably or slidably connected to the rotating shaft of the hinge in the figure.

The mobile terminal with a flexible screen provided in the present invention may be a mobile phone or a computer, etc., which may be folded in a book form. The mobile terminal with a flexible screen is provided with the above-mentioned hinge device and the flexible screen 100, and the flexible screen is disposed at the outside of the mobile terminal with a flexible screen. The first support body, second support body, main support body, and auxiliary support body form a support for the flexible screen.

The above description is only the specific embodiments of the present invention, but the structural features of the present invention are not limited thereto, and any changes or modifications made by those skilled in the art within the scope of the present invention will fall within the scope of protection of the present invention.

The invention claimed is:

1. A hinge of a mobile terminal with a flexible screen, an outer side of which supports the flexible screen, comprises a main support body provided with a rotating shaft of the hinge, the hinge is provided with a first bracket and a second bracket rotatably connected to a rotating shaft of the hinge, a first support body and a second support body respectively slidably connected to the first bracket and the second bracket, an auxiliary support body is separately provided between the first support body and the main support body and between the second support body and the main support body, and the auxiliary support body is correspondingly located at a bend portion of the hinge in a closed state;

the hinge is further provided with a first guide structure rotating around the rotating shaft of the hinge together with the first bracket and a second guide structure rotating around the rotating shaft of the hinge together with the second bracket; the auxiliary support body between the first support body and the main support body is provided with a structure that is in guiding engagement with the first guide structure, and the auxiliary support body between the second support body and the main support body is provided with a structure that is in guiding engagement with the second guide structure; the auxiliary support body between the first support body and the main support body can rotate around the rotating shaft of the hinge together with the first bracket and self-rotate, the auxiliary support body between the second support body and the main support body can rotate around the rotating shaft of the hinge together with the second bracket and self-rotate, and an axis of the self-rotation is parallel to the rotating shaft of the hinge, and a center of self-rotation is substantially located at a flexible screen support reference surface;

the hinge is further provided with a synchronous control mechanism for synchronously rotating the first support body and the second support body with the rotating shaft of the hinge as the axis.

2. The hinge of the mobile terminal with the flexible screen according to claim 1, wherein the hinge is further provided with a belt that is an elastic belt or a flexible belt or a belt that is tensioned by an elastic member or a flexible member; the belt passes through the auxiliary support body and the main support body from a path interesting the rotating shaft of the hinge, and smoothens the auxiliary support body during the rotation and under a stop state, to provide flat support for the flexible screen.

3. The hinge of the mobile terminal with the flexible screen according to claim 2, wherein a groove is disposed on an outer side of the auxiliary support body and the main support body, and the belt passes through the groove, and a plate is further connected to the notch.

4. The hinge of the mobile terminal with the flexible screen according to claim 1, wherein the first guide structure and the second guide structure are both guide grooves, and the auxiliary support body between the first support body and the main support body is provided with a guide pin that is engaged with the first guide structure, and the auxiliary support body between the second support body and the main support body is provided with the guide pin that is engaged with the first guide structure, such that when there are a plurality of auxiliary support bodies between the first support body and the main support body and between the second support body and the main support body, the plurality of auxiliary support bodies can rotate in sequence.

5. The hinge of the mobile terminal with the flexible screen according to claim 1, wherein the first guide structure is provided with a limiting structure for a first structure that is in guiding engagement with the first guide structure, such that the relative position of the first guide structure and the first structure that is in guiding engagement with the first guide structure is in a stable state when the hinge is in a closed state, and the second guide structure is provided with a limiting structure for a second structure that is in guiding engagement with the second guide structure, such that the relative position of the second guide structure and the second structure that is in guiding engagement with the second guide structure is in a stable state when the hinge is in a closed state.

6. The hinge of the mobile terminal with the flexible screen according to claim 1, wherein the synchronous control mechanism comprises a first swing arm and a second swing arm that are rotatably connected to the rotating shaft of the hinge, and the first swing arm and the second swing arm are respectively rotatably connected to one end of a first connecting rod and the second connecting rod, the rotation axes of the first connecting rod and the second connecting rod are perpendicular to the rotating shaft of the hinge, and the other ends of the first connecting rod and the second connecting rod are respectively, rotatably connected to the first support body and the second support body.

7. The hinge of the mobile terminal with the flexible screen according to claim 1, wherein the synchronous control mechanism is located inside of the flexible screen support reference surface and is not in the same plane as the flexible screen support reference surface.

8. The hinge of the mobile terminal with the flexible screen according to claim 1, wherein the rotating shafts of the hinge includes a first shaft and a second shaft in parallel, the first bracket is rotatably connected with the first shaft, the second bracket is rotatably connected with the second shaft, the first swing arm of the synchronous control mechanism is rotatably connected with the first shaft, and the second swing arm is rotatably connected with the second shaft.

9. The hinge of the mobile terminal with the flexible screen according to claim 1, wherein the hinge is further provided with a sheet that can be repeatedly bent; the sheet is located at upper surfaces of ends of the auxiliary support body and the main support body, and the two ends of the sheet are respectively, connected to the first support body and the second support body.

10. The hinge of the mobile terminal with the flexible screen according to claim 1, wherein a first guide groove and a second guide groove are respectively disposed on the first bracket and the second bracket, and the first support body and the second support body are respectively connected with a first slider and a second slider that are slidably connected to the first guide groove and the second guide groove; the first slider and/or the second slider are provided with a recess, and the first bracket and/or the second bracket are provided with a clamp spring, and the clamp spring is provided with a convex portion that fits with the recess, and the recess is fit with the convex portion, to provide hand feeling when the hinge is opened and closed appropriately.

11. A hinge device for a mobile terminal with a flexible screen, comprising two hinges of claim 1, wherein the axes of the rotating shafts of the two hinges are one-to-one coincident, the first support bodies of the two hinges are integrated and the second support bodies are also integrated, the main support bodies of the two hinges are also integrated. The auxiliary support bodies between the first support body and the main support body of two hinges have the same number and are one-to-one connected together, the auxiliary support bodies between the second support body and the main support body of two hinges have the same number and are one-to-one connected together.

12. A mobile terminal with a flexible screen, provided with the hinge device and the flexible screen of claim 11, wherein the flexible screen is disposed outside the mobile terminal with flexible screen.

* * * * *